Patented Oct. 29, 1935

2,018,815

UNITED STATES PATENT OFFICE 2,018,815

LIBERATION OF ALKALI METALS

Percy L. Spencer, West Newton, Mass., assignor to Raytheon Manufacturing Company, Newton, Mass., a corporation of Delaware No Drawing. Application December 29, 1934, Serial No. 759,742

14 Claims. (Cl. 250—27.5)

This invention relates to the liberation and introduction of alkali metals into evacuated or gas-filled containers, such as electrical space discharge devices.

In constructing electrical space discharge devices of various kinds, such as rectifiers, photocells and the like, it is often desirable to introduce a quantity of an alkali metal therein, either to supply an ionizable vapor to produce an active layer on one or more electrodes or for various other reasons. Since the alkali metals are very active and readily react with the atmosphere, they cannot be handled ordinarily in their pure form, and therefore are usually provided in the form of stable compounds of these metals. Heretofore these metals have been introduced into such devices by placing a mixture of a compound of the alkali metal together with a reducing agent, and then causing a reaction between the compound and the reducing agent to liberate the metal. However, with the mixtures heretofore used, it has been very difficult to control the reaction process so that the rate of liberation of the alkali metal and the amount of alkali metal introduced has been difficult to control. Previous mixtures have necessitated the raising of the reaction mixture to a relatively high temperature at which reaction between the compound and the reducing agent took place very rapidly and violently. Once this reaction was started, it was difficult to stop it.

It is desirable that the liberation of alkali metals into electrical space discharge devices be carried on by a controllable process, that is, one in which the rate of liberation and the amount of metal liberated shall be under control at all times.

It is an object of the present invention to provide a novel method of introducing alkali metals into electrical space discharges so that the evolution of the alkali metal takes place slowly and controllably.

The foregoing and other objects of my invention will be best understood from the following description of exemplifications thereof.

In accordance with this invention, the alkali metal which it is desired to utilize in the space discharge device is introduced therein in the form of a stable compound of the alkali metal, preferably a chloride thereof, such as, for example, caesium chloride. The stable compound is mixed with cadmium. Both the alkali metal compound and the cadmium is preferably in finely-divided form. The mixture is either mounted within the space discharge receptacle itself or in a tube connected to said receptacle in such a way that the mixture can be heated to a temperature sufficient to effect reduction of the compound. This heating may be accomplished by electrical induction, by a gas flame or any other suitable method.

I have found that a mixture, such as I have described above, when heated to a comparatively low temperature causes a reaction between the cadmium and the alkali compound, and liberates the alkali metal therefrom. The evolution takes place slowly and controllably. If at any time it is desired to stop the evolution of the alkali metal, it is merely necessary to reduce the temperature somewhat below the reaction temperature. For example, in the case of a mixture of caesium chloride and cadmium, I have found that the desired reaction takes place when the mixture is heated to a temperature as low as about 250° C.

I have found that an excess of cadmium over that necessary to effect a reduction of the alkali metal compound can safely be used, and it is usually preferable to do so. A convenient mixture consists of equal amounts by volume of cadmium and of caesium chloride. However, a much smaller amount of cadmium could also be used, for example, half as much cadmium by volume as caesium chloride might be utilized.

While I have specified caesium chloride as being a compound which could be used, various other compounds of alkali metals could also be utilized, for example, chlorides of the other alkali metals as well as other stable compounds of the alkali metals.

It is understood that many other modifications may be made in the invention described herein without departing therefrom, as many equivalents will suggest themselves to those skilled in the art. It is accordingly desired that the appended claims be given a broad interpretation commensurate with the scope of the invention within the art.

What is claimed is:

1. A mixture for liberating alkali metal comprising a mixture of a stable alkali metal compound and cadmium.

2. A mixture for liberating alkali metal comprising a mixture of a stable alkali metal compound and finely-divided cadmium.

3. A mixture for liberating alkali metal comprising a mixture of an alkali chloride and cadmium.

4. A mixture for liberating alkali metal comprising a mixture of caesium chloride and cadmium.

5. A mixture for liberating alkali metal comprising a mixture of equal amounts by volume of caesium chloride and cadmium.

6. A mixture for liberating alkali metal comprising a mixture of caesium chloride and half as much by volume of cadmium.

7. The method of liberating alkali metal into electrical space discharge devices comprising introducing into the devices a mixture comprised of a stable alkali metal compound and cadmium, and heating the mixture to liberate the alkali metal by the reducing action of the cadmium on the alkali metal compound.

8. The method of liberating alkali metal into electrical space discharge devices comprising introducing into the devices a mixture comprised of an alkali metal chloride and cadmium, and heating the mixture to liberate the alkali metal by the reducing action of the cadmium on the alkali metal chloride.

9. The method of liberating alkali metal into electrical space discharge devices comprising introducing into the devices a mixture comprised of caesium chloride and cadmium, and heating the mixture to liberate the caesium by the reducing action of the cadmium on the caesium chloride.

10. The method of liberating alkali metal into electrical space discharge devices comprising introducing into the devices a mixture comprised of equal amounts by volume of caesium chloride and cadmium, and heating the mixture to liberate the caesium by the reducing action of the cadmium on the caesium chloride.

11. The method of liberating alkali metal into electrical space discharge devices comprising introducing into the devices a mixture comprised of caesium chloride and half as much by volume of cadmium, and heating the mixture to liberate the caesium by the reducing action of the cadmium on the caesium chloride.

12. The method of liberating alkali metal into electrical space discharge devices comprising introducing into the devices a mixture comprised of a stable alkali metal compound and cadmium, and heating the mixture to liberate the alkali metal by the reducing action of the cadmium on the alkali metal compound, and reducing the temperature of the mixture below the reaction temperature before all of the alkali metal has been evolved to control the liberation of said alkali metal.

13. The method of liberating alkali metal into electrical space discharge devices comprising introducing into the devices a mixture comprised of caesium chloride and cadmium, and heating the mixture to about 250° C. to liberate the caesium by the reducing action of cadmium on the caesium chloride.

14. The method of liberating alkali metal into electrical space discharge devices comprising introducing into the devices a mixture comprised of caesium chloride and cadmium, heating the mixture to about 250° C. to liberate the caesium by the reducing action of cadmium on the caesium chloride, and reducing the temperature of the mixture below 250° C. before all of the caesium has been evolved to control the liberation of said caesium.

PERCY L. SPENCER.

CERTIFICATE OF CORRECTION.

Patent No. 2,018,815.                           October 29, 1935.

PERCY L. SPENCER.

It is hereby certified that error appears in the printed specification of the above numbered patent requiring correction as follows: Page 1, second column, line 51, claim 3, after "alkali" insert metal; and that the said Letters Patent should be read with this correction therein that the same may conform to the record of the case in the Patent Office.

Signed and sealed this 7th day of January, A. D. 1936.

(Seal)

Leslie Frazer
Acting Commissioner of Patents.

CERTIFICATE OF CORRECTION.

Patent No. 2,018,815.  October 29, 1935.

PERCY L. SPENCER.

It is hereby certified that error appears in the printed specification of the above numbered patent requiring correction as follows: Page 1, second column, line 51, claim 3, after "alkali" insert metal; and that the said Letters Patent should be read with this correction therein that the same may conform to the record of the case in the Patent Office.

Signed and sealed this 7th day of January, A. D. 1936.

(Seal)

Leslie Frazer
Acting Commissioner of Patents.